(12) United States Patent
Liu

(10) Patent No.: US 11,678,156 B2
(45) Date of Patent: *Jun. 13, 2023

(54) METHOD AND TERMINAL DEVICE FOR DATA TRANSMISSION

(71) Applicant: GUANGDONG OPPO MOBILE TELECOMMUNICATIONS CORP., LTD., Guangdong (CN)

(72) Inventor: Jianhua Liu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/477,876

(22) Filed: Sep. 17, 2021

(65) Prior Publication Data
US 2022/0007160 A1  Jan. 6, 2022

Related U.S. Application Data

(63) Continuation of application No. 16/996,766, filed on Aug. 18, 2020, now Pat. No. 11,146,926, which is a (Continued)

(30) Foreign Application Priority Data

Mar. 29, 2018  (WO) ................ PCT/CN2018/081182

(51) Int. Cl.
*H04W 4/40* (2018.01)
*H04W 72/02* (2009.01)
(Continued)

(52) U.S. Cl.
CPC ............ *H04W 4/40* (2018.02); *H04W 72/02* (2013.01); *H04W 72/1263* (2013.01); *H04W 80/02* (2013.01); *H04W 92/18* (2013.01)

(58) Field of Classification Search
CPC ... H04W 4/40; H04W 72/02; H04W 72/1263; H04W 80/02; H04W 92/18; H04W 40/24;
(Continued)

(56) References Cited

U.S. PATENT DOCUMENTS 7,873,050 B2  1/2011  Kim et al.
9,844,026 B2  12/2017 Le Thierry D'Ennequin et al.
(Continued)

FOREIGN PATENT DOCUMENTS

CN  103716117 A  4/2014
CN  103841649 A  6/2014
(Continued)

OTHER PUBLICATIONS

European Search Report in the European application No. 22156932. 0, dated Apr. 21, 2022. 6 pages.
(Continued)

*Primary Examiner* — Harry H Kim
(74) *Attorney, Agent, or Firm* — Perkins Coie LLP

(57) ABSTRACT

Embodiments of the present application disclose a method and terminal device for data transmission. The method is applied to a vehicle-to-everything system, and comprises: a terminal device in a first protocol layer determining, according to service information of data to be sent, a transmission mechanism for transmitting the data to be sent. The method and terminal device in the embodiments of the present application enhance data transmission capabilities.

10 Claims, 7 Drawing Sheets

Related U.S. Application Data continuation of application No. PCT/CN2018/085860, filed on May 7, 2018.

(51) Int. Cl.

| | | |
|---|---|---|
| *H04W 72/12* | (2009.01) | |
| *H04W 80/02* | (2009.01) | |
| *H04W 92/18* | (2009.01) | |
| *H04L 1/08* | (2006.01) | |
| *H04L 27/20* | (2006.01) | |
| *H04L 5/00* | (2006.01) | |
| *H04L 27/00* | (2006.01) | |
| *H04W 40/24* | (2009.01) | |
| *H04L 27/36* | (2006.01) | |
| *H04W 88/06* | (2009.01) | |
| *H04W 72/1263* | (2023.01) | |

(58) Field of Classification Search
CPC . H04W 88/06; H04W 40/02; H04W 72/1215; H04W 80/08; H04L 1/08; H04L 1/1887; H04L 27/2035; H04L 27/206; H04L 5/0098; H04L 27/0008; H04L 5/001; H04L 5/0023; H04L 27/362; H04L 1/0001; H04L 69/322; H04L 67/12; H04L 1/0002; H04L 67/51; Y02D 30/70
See application file for complete search history.

(56) References Cited

U.S. PATENT DOCUMENTS

| | | | |
|---|---|---|---|
| 11,146,926 B2* | 10/2021 | Liu | H04L 1/08 |
| 2006/0177023 A1* | 8/2006 | Vaghar | H04M 3/53333 379/88.17 |
| 2012/0027065 A1 | 2/2012 | Ray et al. | |
| 2013/0230032 A1 | 9/2013 | Lu et al. | |
| 2015/0078301 A1 | 3/2015 | Toth et al. | |
| 2015/0249981 A1 | 9/2015 | Wu et al. | |
| 2015/0263957 A1 | 9/2015 | Wang et al. | |
| 2016/0112992 A1 | 4/2016 | Bhushan et al. | |
| 2016/0183276 A1* | 6/2016 | Marinier | H04W 72/02 370/329 |
| 2016/0234806 A1 | 8/2016 | Le Thierry D'Ennequin et al. | |
| 2018/0103454 A1 | 4/2018 | Le Thierry D'Ennequin et al. | |
| 2018/0132208 A1 | 5/2018 | Pan et al. | |
| 2018/0324010 A1* | 11/2018 | Gulati | H04L 27/04 |
| 2019/0068312 A1* | 2/2019 | Zhang | H04L 1/0033 |
| 2019/0090107 A1* | 3/2019 | Kim | H04W 80/08 |
| 2019/0150034 A1* | 5/2019 | Chen | H04L 47/826 370/236 |
| 2019/0199467 A1 | 6/2019 | Vu | |
| 2019/0215801 A1 | 7/2019 | Mok et al. | |
| 2019/0253186 A1 | 8/2019 | Khoshnevisan et al. | |
| 2019/0253927 A1 | 8/2019 | Mok et al. | |
| 2019/0260495 A1 | 8/2019 | Nammi | |
| 2019/0386867 A1 | 12/2019 | Liu et al. | |
| 2020/0015241 A1 | 1/2020 | Marinier et al. | |
| 2020/0136746 A1* | 4/2020 | Li | H04L 1/0016 |
| 2020/0305188 A1 | 9/2020 | Liu et al. | |
| 2020/0313802 A1 | 10/2020 | Xu et al. | |

FOREIGN PATENT DOCUMENTS

| | | |
|---|---|---|
| CN | 106488386 A | 3/2017 |
| CN | 106559337 A | 4/2017 |
| CN | 107040972 A | 8/2017 |
| CN | 107113538 A | 8/2017 |
| EP | 3031189 A1 | 6/2016 |
| EP | 3133848 A1 | 2/2017 |
| EP | 3282794 A1 | 2/2018 |
| WO | 2012049351 A1 | 4/2012 |
| WO | 2015021185 A1 | 2/2015 |
| WO | 2015021317 A1 | 2/2015 |

OTHER PUBLICATIONS

First Office Action of the Japanese application No. 2020-541450, dated Mar. 4, 2022. 8 pages with English translation.
LG Electronics "Discussion related to LS from 5GAA on LS on V1 and V2 reference points (S2-180021)" SA WG2 Meeting #125 S2-180533(revision of S2-18xxxx), Jan. 22-26, 2018, Gothenburg, Sweden. 4 pages.
LG Electronics Inc. "RAN2 aspects regarding support of 64QAM and TX diversity" 3GPP TSG-RAN2#101 R2-1802699(Revision of R2-1713824), Athens, Greece, Feb. 26-Mar. 2, 2018. 3 pages.
LG Electronics Inc. "The way to figure out high rate transmission support of transmitting UEs" 3GPP TSG-RAN2#101 R2-1803014, Athens, Greece, Feb. 26-Mar. 2, 2018. 2 pages.
Motorola Mobility et al. "Solution for Key Issue #4: Re-use PPPP mechanism for enhanced V2X" SA WG2 Meeting #126 S2-182161 (revision of S2-), Feb. 26-Mar. 2, 2018, Montreal, Canada. 3 pages.
USPTO, Corrected Notice of Allowability for U.S. Appl. No. 16/996,766, dated Sep. 9, 2021. 7 pages.
ZTE Corporation "Discussion on Rel-14 and Rel-15 V2X coexistence issues" 3GPP TSG RAN WG2 Meeting #101 R2-1801963, Athens, Greece, Feb. 26-Mar. 2, 2018. 4 pages.
First Office Action of the Chilean application No. 202002196, dated Oct. 15, 2021. 18 pages with English translation.
3GPP TS 36.300 V13.9.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), Technical Specification, (Sep. 2017). 313 pages.
First Office Action of the Korean application No. 10-2020-7021521, dated Jun. 8, 2022. 13 pages with English translation.
Non-Final Office Action dated Nov. 13, 2020 of U.S. Appl. No. 16/996,766, filed Aug. 18, 2020.
Notice of Allowance dated Jun. 9, 2021 of U.S. Appl. No. 16/996,766, filed Aug. 18, 2020.
First Office Action of the Chinese application No. 202010451636.3, dated Oct. 9, 2022. 14 pages with English translation.
Notice of Rejection of the Korean application No. 10-2020-7021521, dated Dec. 23, 2022. 8 pages with English translation.
Notice of Final Rejection of the Korean application No. 10-2020-7021521, dated Apr. 7, 2023. 8 pages with English translation.

* cited by examiner

METHOD AND TERMINAL DEVICE FOR DATA TRANSMISSION

CROSS-REFERENCE TO RELATED APPLICATIONS

This application is a continuation of U.S. patent application Ser. No. 16/996,766 filed Aug. 18, 2020, which is a continuation of PCT Application No. PCT/CN2018/085860, filed on May 7, 2018 and entitled "Method and Terminal Device For Data Transmission", which claims priority to PCT Application No. PCT/CN2018/081182, filed on Mar. 29, 2018 and entitled "Method and Terminal Device For Data Transmission". The disclosures of the above applications are hereby incorporated by reference in their entireties.

TECHNICAL FIELD

Embodiments of the disclosure relate to the field of communication, and more particularly to a method for data transmission and terminal device.

BACKGROUND

Internet of vehicles or Vehicle to Everything (V2X) communication system is a sidelink (SL) transmission technology based on device-to-device (D2D) communication. Unlike a conventional long term evolution (LTE) system in which data reception and sending is performed through a base station, an Internet of vehicles system adopts a D2D communication manner and thus is higher in spectrum efficiency and lower in transmission delay.

Along with the evolution of communication systems, more and more transmission mechanisms have been adopted for data channels, for example, a digital modulation mechanism, a rate matching mechanism, a duplicate transmission mechanism or a Transmit Diversity (TxD). The digital modulation mechanism may include quadrature phase shifting keying (QPSK), 16 Quadrature Amplitude Modulation (QAM), 64QAM and the like. How to determine a transmission mechanism to be adopted by a terminal device to send data is a problem to be solved.

DETAILED DESCRIPTION

Figure 1:
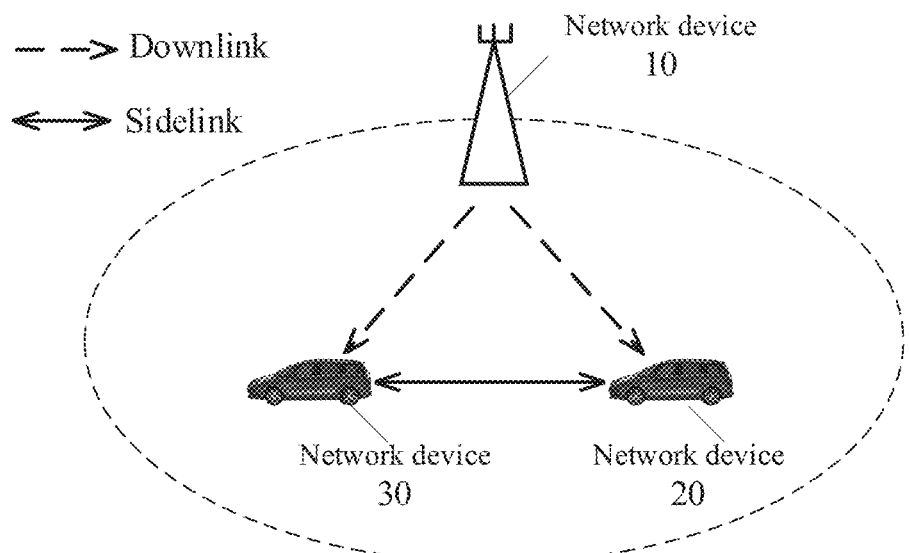
FIG. 1 is a schematic diagram of an application scenario according to an embodiment of the disclosure.

The technical solutions in the embodiments of the disclosure will be clearly and completely described below in combination with the drawings in the embodiments of the disclosure.

It is to be understood that the technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system, NR or a future 5th-Generation (5G) system.

Particularly, the technical solutions of the embodiments of the disclosure may be applied to various nonorthogonal multiple access technology-based communication systems, for example, a Sparse Code Multiple Access (SCMA) system and a Low Density Signature (LDS) system, and of course, the SCMA system and the LDS system may also have other names in the field of communication. Furthermore, the technical solutions of the embodiments of the disclosure may be applied to multi-carrier transmission systems adopting nonorthogonal multiple access technologies, for example, Orthogonal Frequency Division Multiplexing (OFDM), Filter Bank Multi-Carrier (FBMC), Generalized Frequency Division Multiplexing (GFDM) and Filtered-OFDM (F-OFDM) systems adopting the nonorthogonal multiple access technologies.

In the embodiments of the disclosure, a terminal device may refer to User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle device, a wearable device, a terminal device in a future 5G network, a terminal device in a future evolved Public Land Mobile Network (PLMN) or the like. There are no limits made in the embodiments of the disclosure.

In the embodiments of the disclosure, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario. Or the network device may be a relay station, an access point, a vehicle device, a wearable device, a network device in the future 5G network, a network device in the future evolved PLMN or the like. There are no limits made in the embodiments of the disclosure.

In view of this, the embodiments of the disclosure provide a method for data transmission and a terminal device. A transmission mechanism to be adopted is determined according to service information of data to be sent, and then a terminal device may send the data by use of a more suitable transmission mechanism, so that data transmission performance is improved.

A first aspect provides a method for data transmission, which may be applied to an Internet of vehicles system and include: determining at a first protocol layer, by a terminal device, a transmission mechanism for transmitting data to be sent, according to service information of the data to be sent.

In a possible implementation mode, the service information may include at least one piece of information of the following information: a service identifier, an Internet Protocol (IP) address, a service type, a service requirement, band information, version information, a fully qualified domain name (FQDN), layer-2 address information, proximity-based service (ProSe) per-packet priority (PPPP) information, or ProSe per-packet reliability (PPPR) information.

Alternatively, the IP address may be an IP address of a server.

In a possible implementation mode, the method may further include: acquiring at a second protocol layer, by the terminal device, the service information; and sending at the second protocol layer, by the terminal device, the service information to the first protocol layer.

In a possible implementation mode, when the service information is version information, acquiring at the second protocol layer, by the terminal device, the service information of the data to be sent may include: determining at the second protocol layer, by the terminal device, the version information of the data to be sent according to at least one piece of information of the following information: a service identifier, an IP address, a service type, a service requirement, band information, a FQDN, layer-2 address information, PPPP information, or PPPR information, wherein the version information is used for indicating a protocol version for a service corresponding to the data to be sent.

In a possible implementation mode, when the service information is at least one piece of information of the following information: a service identifier, an IP address, a service type, a service requirement, band information, a FQDN, layer-2 address information, PPPP information, or PPPR information, the method may further include: determining at the first protocol layer, by the terminal device, version information of the data to be sent according to the at least one piece of information, wherein the version information is used for indicating a protocol version for a service corresponding to the data to be sent.

In a possible implementation mode, the operation of determining, by the terminal device, the version information of the data to be sent according to the at least one piece of information may include: determining, by the terminal device, the version information of the data to be sent, according to the at least one piece of information and a mapping relationship between the at least one piece of information and the version information.

In a possible implementation mode, the mapping relationship may be pre-stored in the terminal device, or may be configured by a network device, or may be configured by a server.

In a possible implementation mode, the transmission mechanism may include at least one of the following: a digital modulation mechanism, a rate matching mechanism, a duplicate transmission mechanism, or a Transmit Diversity (TxD).

In a possible implementation mode, the digital modulation mechanism may include one of binary phase shifting keying (BPSK), QPSK, 16QAM, 64QAM and 256QAM.

In a possible implementation mode, the first protocol layer may be an access layer, and the second protocol layer may be an application layer.

In a possible implementation mode, the method may further include that: the terminal device determines, at the first protocol layer, a transmission carrier for the data to be sent, according to a mapping relationship between the transmission mechanism and a transmission carrier.

In a possible implementation mode, the operation of determining at the first protocol layer, by the terminal device, the transmission mechanism for transmitting the data to be sent according to the service information of the data to be sent may include: determining at the first protocol layer, by the terminal device, at least one transmission mechanism for transmitting the data to be sent, according to the service information; and the method may further include: determining at the first protocol layer, by the terminal device, a transmission mechanism for transmission of the data to be sent, from the at least one transmission mechanism, according to a mapping relationship between the at least one transmission mechanism and a transmission carrier, and the transmission carrier for the data to be sent.

In a possible implementation mode, the method may further include: determining at a third protocol layer, by the terminal device, a transmission carrier for the data to be sent, according to a mapping relationship between the transmission mechanism and the transmission carrier, the third protocol layer being a layer below the first protocol layer.

In a possible implementation mode, the operation of determining at the first protocol layer, by the terminal device, the transmission mechanism for transmitting the data to be sent according to the service information of the data to be sent may include: determining at the first protocol layer, by the terminal device, at least one transmission mechanism for transmitting the data to be sent, according to the service information; and the method may further include: determining at a third protocol layer, by the terminal device, the transmission mechanism for transmission of the data to be sent, from the at least one transmission mechanism, according to a mapping relationship between the at least one transmission mechanism and a transmission carrier, and the transmission carrier for the data to be sent, the third protocol layer being a layer below the first protocol layer.

A second aspect provides a method for data transmission, which may be applied to an Internet of vehicles system and include: acquiring, by a terminal device, service information of data to be sent; and determining, by the terminal device, a transmission path for transmitting the data to be sent, from multiple transmission paths, according to the service information.

In a possible implementation mode, the multiple transmission paths may include a cellular path and at least one SL path, the SL path being a D2D path between two terminal devices.

In a possible implementation mode, the multiple transmission paths may include multiple SL paths, the SL path being a D2D path between two terminal devices.

In a possible implementation mode, the multiple SL paths may include at least two of a new radio (NR) link, an LTE link, or a wireless local area network (WLAN) link.

In a possible implementation mode, the service information may include at least one piece of information of the following information: a service identifier, an IP address, a service type, a service requirement, band information, version information, an FQDN, layer-2 address information, PPPP information, or PPPR information.

In a possible implementation mode, the operation determining, by the terminal device, the transmission path for transmitting the data to be sent, from the multiple transmission paths, according to the service information may include: determining at a first protocol layer, by the terminal device, the transmission path for transmitting the data to be sent, from the multiple transmission paths, according to the service information and path configuration information, wherein the path configuration information is used for indicating a mapping relationship between the service information and a transmission path.

In a possible implementation mode, at least one of the service information or the path configuration information is configured or pre-stored at the first protocol layer through a network.

In a possible implementation mode, the method may further include: transmitting at the first protocol layer, by the terminal device, the data to be sent to a protocol layer of the transmission path determined by the terminal device.

In a possible implementation mode, the first protocol layer may be an application layer, an access layer, or a sublayer of the access layer.

A third aspect provides a terminal device, which is configured to execute the method in the first aspect or any possible implementation mode of the first aspect. Specifically, the terminal device includes units configured to execute the method in the first aspect or any possible implementation mode of the first aspect.

A fourth aspect provides a terminal device, which is configured to execute the method in the second aspect or any possible implementation mode of the second aspect. Specifically, the terminal device includes units configured to execute the method in the second aspect or any possible implementation mode of the second aspect.

A fifth aspect provides a terminal device, which includes a memory, a processor, an input interface and an output interface. The memory, the processor, the input interface and the output interface are connected through a bus system. The memory is configured to store instructions. The processor is configured to execute the instructions stored in the memory to execute the method in the first aspect or any possible implementation mode of the first aspect.

A sixth aspect provides a terminal device, which includes a memory, a processor, an input interface and an output interface. The memory, the processor, the input interface and the output interface are connected through a bus system. The memory is configured to store instructions. The processor is configured to execute the instructions stored in the memory to execute the method in the second aspect or any possible implementation mode of the second aspect.

A seventh aspect provides a method for data transmission, which may be applied to an Internet of vehicles system and include at least one of the following: determining, by a terminal device, a transmission mechanism for transmitting data to be sent on a first transmission resource, according to configuration information; or selecting, by the terminal device, a transmission resource for the data to be sent, according to the configuration information.

In a possible implementation mode, the configuration information may be used for indicating at least one selectable transmission mechanism on the first transmission resource.

In a possible implementation mode, the method may further include that: the terminal device receives first indication information, the first indication information being used for indicating a first transmission mechanism in the at least one transmission mechanism; and the operation that the terminal device determines the transmission mechanism for transmitting the data to be sent on the first transmission resource according to the configuration information may include that: the terminal device determines the first transmission mechanism to be the transmission mechanism for transmitting the data to be sent on the first transmission resource according to the configuration information and the first indication information.

In a possible implementation mode, the configuration information may be used for indicating a mapping relationship between the transmission resource and the transmission mechanism.

In a possible implementation mode, the method may further include: receiving, by the terminal device, second indication information, the second indication information being used for indicating a second transmission mechanism in the mapping relationship; and the operation of selecting, by the terminal device, the transmission resource for the data to be sent according to the configuration information may include: determining, by the terminal device, a transmission resource corresponding to the second transmission mechanism in the mapping relationship, to be the transmission resource for the data to be sent.

In a possible implementation mode, selection of the transmission resource may include at least one of carrier selection or carrier reselection.

In a possible implementation mode, selection of the transmission resource may include at least one of resource pool selection or resource pool reselection.

An eighth aspect provides a terminal device, which is configured to execute the method in the seventh aspect or any possible implementation mode of the seventh aspect. Specifically, the terminal device includes units configured to execute the method in the seventh aspect or any possible implementation mode of the seventh aspect.

A ninth aspect provides a terminal device, which includes a memory, a processor, an input interface and an output interface. The memory, the processor, the input interface and the output interface are connected through a bus system. The memory is configured to store instructions. The processor is configured to execute the instructions stored in the memory to execute the method in the seventh aspect or any possible implementation mode of the seventh aspect.

A tenth aspect provides a chip, which is configured to implement the method in the first aspect or any possible implementation mode of the first aspect, or the method in the second aspect or any possible implementation mode of the second aspect or the method in the seventh aspect or any possible implementation mode of the seventh aspect.

Specifically, the chip includes a processor, configured to call and run a computer program in a memory to enable a device installed with the chip to execute the method in the first aspect or any possible implementation mode of the first aspect, or the method in the second aspect or any possible implementation mode of the second aspect or the method in the seventh aspect or any possible implementation mode of the seventh aspect.

An eleventh aspect provides a computer storage medium, which is configured to store computer software instructions for executing the method in the first aspect or any possible implementation mode of the first aspect, or the method in the second aspect or any possible implementation mode of the second aspect or the method in the seventh aspect or any possible implementation mode of the seventh aspect, the instructions including a program designed to execute the aspects.

A twelfth aspect provides a computer program product including instructions, which runs in a computer to enable the computer to execute the method in the first aspect or any optional implementation mode of the first aspect, or the method in the second aspect or any optional implementation mode of the second aspect or the method in the seventh aspect or any possible implementation mode of the seventh aspect.

These aspects or other aspects of the disclosure will become clearer and easier to understand through the following descriptions about the embodiments.

Figure 2:
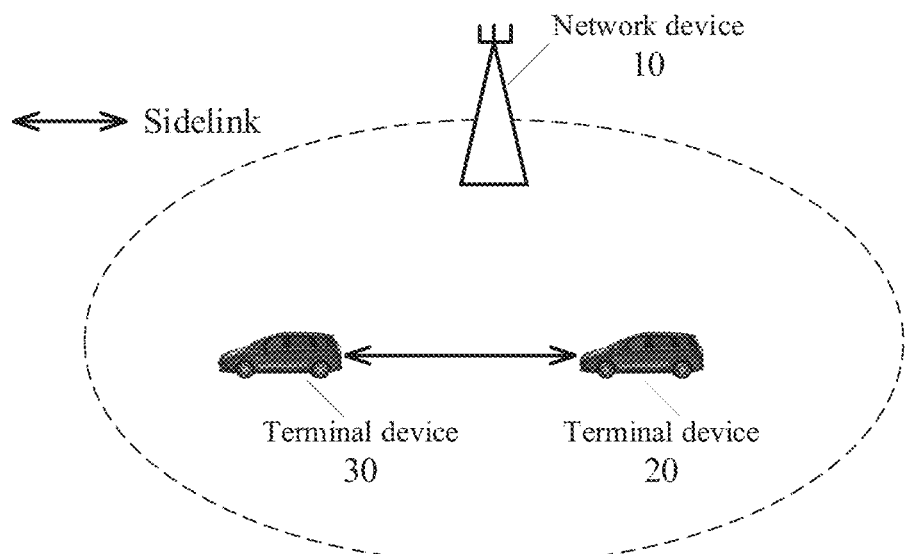
FIG. 2 is a schematic diagram of another application scenario according to an embodiment of the disclosure.

Each of FIG. 1 and FIG. 2 is a schematic diagram of an application scenario according to an embodiment of the disclosure. A network device and two terminal devices are exemplarily illustrated in FIG. 1. Alternatively, a wireless communication system may include multiple network devices, and another number of terminal devices may be included in coverage of each network device. There are no limits made thereto in the embodiments of the disclosure. In addition, the wireless communication system may further include another network entity such as a Mobile Management Entity (MME), a Serving Gateway (S-GW) and a Packet data Network Gateway (P-GW). However, the embodiments of the disclosure are not limited thereto.

Specifically, a terminal device 20 may communicate with a terminal device 30 in a D2D communication mode. During D2D communication, the terminal device 20 directly communicates with the terminal device 30 through a D2D link, i.e., an SL. For example, as illustrated in FIG. 1 or FIG. 2, the terminal device 20 directly communicates with the terminal device 30 through the SL. In FIG. 1, the terminal device 20 communicates with the terminal device 30 through the SL, for which a transmission resource is allocated by a network device. In FIG. 2, the terminal device 20 communicates with the terminal device 30 through the SL, for which a transmission resource is selected independently by the terminal device, and does not have to be allocated by the network device.

The D2D communication mode may be applied to Vehicle to Vehicle (V2V) communication or V2X communication. In V2X communication, X may generally refer to any device with a wireless receiving and sending capability, for example, but not limited to, a wireless device moving at a low speed, a vehicle device moving at a high speed or a network control node with a wireless transmitting and receiving capability, etc. It is to be understood that the embodiments of the disclosure are mainly applied to a V2X communication scenario but may also be applied to any other D2D communication scenario. There are no limits made thereto in the embodiments of the disclosure.

In an Internet of vehicles system, two types of terminal devices may exist, i.e., terminal devices having a sensing capability, for example, Vehicle User Equipment (VUE) or Pedestrian User Equipment (PUE), and terminal devices having no sensing capability, for example, PUE. VUE has a higher processing capability, and is usually powered by a storage battery in a vehicle. PUE has a relatively low processing capability, and thus reduction in power consumption is also a main factor to be considered for PUE. Therefore, in an existing Internet of vehicles system, VUE is considered to have a complete receiving capability and sensing capability, while PUE is considered to have partial or no receiving and sensing capabilities. If the PUE has the partial sensing capability, the PUE may adopt a sensing method similar to that for the VUE for resource selection, and select an available resource from resources that can be sensed. If the PUE has no sensing capability, the PUE randomly selects a transmission resource from a resource pool.

In 3rd Generation Partnership Project (3GPP) Release-14, two transmission modes are defined, i.e., a transmission mode 3 (mode 3) and a transmission mode 4 (mode 4). In the transmission mode 3, a transmission resource of a terminal device is allocated by a base station, and the terminal device performs data transmission on an SL according to the resource allocated by the base station; and the base station may allocate a resource for single transmission to the terminal device, or may allocate a resource for semi-persistent transmission to the terminal device. In the transmission mode 4, if a terminal device having a sensing capability, the terminal device transmits data in a manner combining sensing and reservation, and if the terminal device has no sensing capability, the terminal device randomly selects a transmission resource from a resource pool. The terminal device having the sensing capability acquires an available transmission resource set from the resource pool in a sensing manner, and the terminal device randomly selects a resource from the set for data transmission. Since a service in an Internet of vehicles system is periodic, the terminal device usually adopts a semi-persistent transmission manner, namely the terminal device, after selecting a transmission resource, may keep using the resource in multiple transmission cycles, so that probabilities of resource reselection and resource conflict are reduced. The terminal device may carrying information for reserving the resource for next transmission in control information for the current transmission, such that other terminal device(s) can detect the control information of the terminal device, thereby determining whether the resource is reserved and used by the terminal device. In this way, resource conflict is reduced.

Along with the evolution of communication systems, more and more transmission mechanisms have been adopted for data channels, for example, a digital modulation mechanism, a rate matching mechanism, a duplicate transmission mechanism or a TxD. The digital modulation mechanism may include QPSK, 16QAM, 64QAM and the like. How to determine a transmission mechanism to be adopted by a terminal device to send data is a problem to be solved.

It is to be understood that the embodiments of the disclosure are described with the Internet of vehicles system as an example. The embodiment of the disclosure may also be applied to, for example, data transmission between a terminal device and a network device, in a cellular network. The embodiments of the disclosure should not be limited thereto.

Figure 3:
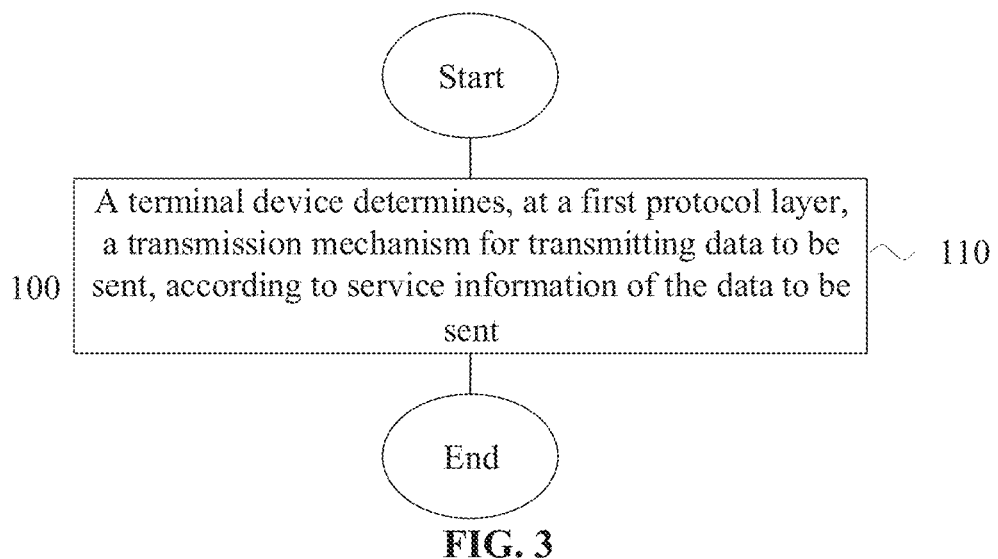
FIG. 3 is a schematic block diagram of a method for sending data according to an embodiment of the disclosure.

FIG. 3 is a schematic block diagram of a method 100 for data transmission according to an embodiment of the disclosure. As illustrated in FIG. 3, the method 100 is applied to an Internet of vehicles system. The method 100 includes part or all of the following contents.

In S110, a terminal device determines, at a first protocol layer, a transmission mechanism for transmitting data to be sent according to service information of the data to be sent.

First of all, it is necessary to describe the terminal device in the Internet of vehicles system. The terminal device in the Internet of vehicles may generally include a context awareness layer, a network access layer, a network control layer and an application/service layer. Each layer forms a corresponding relationship with a control device at a network side.

In the embodiment of the disclosure, the terminal device may acquire, at a second protocol layer, the service information of the data to be sent at first. For example, the terminal device may acquire the service information of the data to be sent from the application/service layer. The service information may be any information related to a service associated with the data to be sent. For example, it may be at least one of a service identifier, an IP address, a service type, a service requirement, band information, version information, an FQDN, layer-2 address information, PPPP information, or PPPR information. The terminal device may send, at the second protocol layer, the acquired service information of the data to be sent to the first protocol layer, and the terminal device may further determine, at the first protocol layer, the transmission mechanism for transmitting the data to be sent according to the service information acquired at the second protocol layer. For example, the terminal device may determine, at the access layer, the transmission mechanism for transmitting the data to be sent according to the service information acquired at the application layer. After the transmission mechanism is determined, the terminal device may adopt the transmission mechanism to send the data.

Or, the terminal device may also acquire, at the first protocol layer, the service information of the data to be sent, and determine, at the second protocol layer, the transmission mechanism for transmitting the data to be sent, according to the acquired service information. For example, the terminal device may acquire, at the application layer, the service information of the data to be sent, and determine, at the application layer, the transmission mechanism for transmitting the data to be sent, according to the service information.

Alternatively, a network device or a server may configure a mapping relationship between different service information and different transmission mechanisms in advance. Or, the mapping relationship may be pre-stored in the terminal device. Taking service type and digital modulation mechanism as an example, there is made such a hypothesis that a voice service may correspond to BPSK, QPSK and 16QAM and a video service may correspond to 16QAM, 64QAM and 256QAM, if the terminal device determines that a service type of the data to be sent is a voice service, the transmission mechanism available for the terminal device may be one of BPSK, QPSK and 16QAM. If the terminal device determines that the service type of the data to be sent is a video service, the transmission mechanism available for the terminal device may be one of 16QAM, 64QAM and 256QAM.

Alternatively, the network device may not configure the mapping relationship between the service information and the transmission mechanisms in advance; instead, after the terminal device sends the service information of the data to be sent, one transmission mechanism may be directly selected from multiple transmission mechanisms to transmit the data. For example, service type and digital modulation mechanism are still adopted. If the terminal device determines that the service type of the data to be sent is a voice service, the terminal device may select one transmission mechanism from all digital modulation mechanisms such as BPSK, 2/π-BPSK, QPSK, 16QAM, 64QAM and 256QAM. If the terminal device determines that the service type of the data to be sent is a video service, the terminal device may also select one transmission mechanism from all the digital modulation mechanisms. The transmission mechanism selected for the voice service and the transmission mechanism selected for the video service may be the same or may be different from each other.

It is to be understood that descriptions are made here only with the condition that the transmission mechanism is the digital modulation mechanism as an example. Of course, the transmission mechanism may also be a rate matching mechanism, duplicate transmission mechanism and the like listed above.

Part of the service information listed above will be described below one by one.

The service identifier refers to information for identifying the service. Different services may correspond to different identifiers. It is similar to other identification information and will not be described in details herein.

The IP address may refer to a serial number assigned to the terminal device in a network. The IP address may be a 32 bit binary number, for example, 43.246.231.110. The IP address may be an IP address of a server.

The service type is the abovementioned service type. For example, the service type may be a video service, a voice service or a short messaging service.

The service requirement may refer to delay requirements, rate requirements, reliability requirements and the like of different services. For example, an Ultra-reliable and Low Latency Communications (URLLC) service in 5G has a relatively high delay requirement, while an Enhanced Mobile Broadband (EMBB) in 5G has a relatively low delay requirement.

The band information may refer to information of band(s) in which the service is sent. Different services may be sent on different bands.

FQDN information may refer to a host name plus a full path, and all domain members in a sequence are listed in the full path.

The layer-2 address information: layer 2 may refer to a data link layer and, for example, may refer to a Media Access Control (MAC) layer, a Radio Link Control (RLC) layer and Packet Data Convergence Protocol (PDCP).

The version information: the version information may refer to a protocol version for the service, for example, Rel-14 and Rel-15. For example, in the Internet of vehicles system, some new services such as an autopilot service and a vehicle formation service are introduced into Rel-15, compared with Rel-14.

Alternatively, in the embodiment of the disclosure, if the service information is the version information, the terminal device determines, at the second protocol layer, the version information of the data to be sent according to at least one of the following information: the service identifier, the IP address, the service type, the service requirement, the band information, the FQDN, the layer-2 address information, the PPPP information, or the PPPR information, the version information being used for indicating a protocol version for a service corresponding to the data to be sent.

Furthermore, the terminal device may send, at the second protocol layer, the determined version information to the first protocol layer.

Specifically, the terminal device may determine, at the second protocol layer, the version, for example, Rel-14, Rel-15 or another protocol version, for the service corresponding to the data to be sent at first according to the service information except the version information, the terminal device may further send, at the second protocol layer, version indication information to the first protocol layer, different versions corresponding to different transmission mechanisms, and then the terminal device may determine, at the first protocol layer, the transmission mechanism corresponding to the version indicated by the version indication information. For example, if the second protocol layer indicates that the version is Rel-14 to the first protocol layer, the terminal device may adopt, at the first protocol layer, the rate matching mechanism corresponding to Rel-14 to transmit the data; and if the second protocol layer indicates that the version is Rel-15 to the first protocol layer, the terminal device may adopt, at the first protocol layer, a TxD mechanism corresponding to Rel-15.

Alternatively, in the embodiment of the disclosure, the terminal device may send, at the second protocol layer, at least one of the following information to the first protocol layer: the service identifier, the IP address, the service type, the service requirement, the band information, the FQDN, the layer-2 address information, the PPPP information, or the PPPR information, and the method further includes that: the terminal device determines, at the first protocol layer, the version information of the data to be sent according to the at least one of information, the version information being used for indicating the protocol version for the service corresponding to the data to be sent.

That is, the terminal device may not determine the version information at the second protocol layer, but send the service information except the version information to the first protocol layer, and then determine, at the first protocol layer, the version information according to the service information, so that the transmission mechanism corresponding to the version information may be determined.

Alternatively, the network device or the server may configure a mapping relationship between other service information and version information in advance, or the mapping relationship may be pre-stored in the terminal device. The mapping relationship may also be set based on a preference of the terminal device.

Alternatively, in the embodiment of the disclosure, the method further includes that: the terminal device determines, at the first protocol layer, a transmission carrier for the data to be sent according to a mapping relationship between the transmission mechanism and the transmission carrier.

Alternatively, in the embodiment of the disclosure, the method further includes that: the terminal device determines, at a third protocol layer, the transmission carrier for the data to be sent according to the mapping relationship between the transmission mechanism and the transmission carrier, the third protocol layer being a layer below the first protocol layer.

Specifically, the service information may have a mapping relationship with the transmission mechanism and the transmission carrier respectively. That is, the transmission carrier for the data to be sent or the transmission mechanism for the data to be sent may be determined according to the service information of the data to be sent. Therefore, the transmission carrier has a corresponding mapping relationship with the transmission mechanism. The terminal device, after determining the transmission mechanism for the data to be sent, may further determine the transmission carrier for the data to be sent according to the mapping relationship between the transmission mechanism and the transmission carrier. It is to be noted that the transmission carrier may be determined at the first protocol layer or the third protocol layer, i.e., a layer below the first protocol layer. There are no limits made thereto in the embodiment of the disclosure.

Alternatively, in the embodiment of the disclosure, the operation that the terminal device determines, at the first protocol layer, the transmission mechanism for transmitting the data to be sent according to the service information of the data to be sent includes that: the terminal device determines, at the first protocol layer, at least one transmission mechanism for transmitting the data to be sent according to the service information; and the method further includes that: the terminal device determines, at the first protocol layer, the transmission mechanism for transmission of the data to be sent from the at least one transmission mechanism, according to the mapping relationship between the transmission mechanism and the transmission carrier, and the transmission carrier for the data to be sent.

Alternatively, in the embodiment of the disclosure, the operation that the terminal device determines, at the first protocol layer, the transmission mechanism for transmitting the data to be sent according to the service information of the data to be sent includes that: the terminal device determines, at the first protocol layer, the at least one transmission mechanism for transmitting the data to be sent according to the service information; and the method further includes that: the terminal device determines, at the third protocol layer, the transmission mechanism for transmission of the data to be sent in the at least one transmission mechanism, according to a mapping relationship between multiple transmission mechanisms and transmission carriers, and the transmission carrier for the data to be sent, the third protocol layer being a layer below the first protocol layer.

Specifically, the terminal device may determine multiple available transmission mechanisms at first according to the service information of the data to be sent, and then the terminal device may further determine the transmission mechanism finally for transmission of the data to be sent according to the mapping relationship between the transmission mechanism and the transmission carrier, and the transmission carrier for the data to be sent. Similarly, the final transmission mechanism may be determined at the first protocol layer or may be determined at the third protocol layer.

Therefore, according to the method for data transmission of the embodiment of the disclosure, the terminal device may send the data by use of a more suitable transmission mechanism, and thus data transmission performance is improved.

Figure 4:
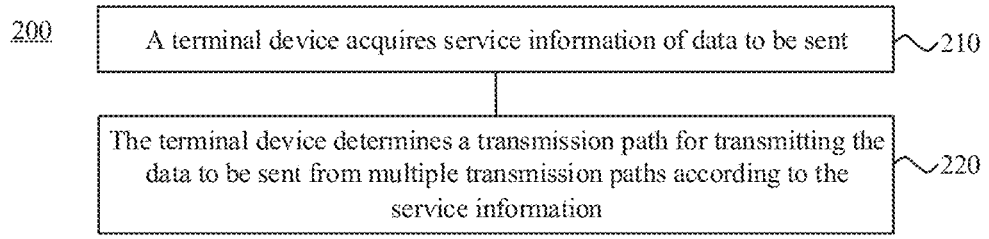
FIG. 4 is a schematic block diagram of another method for sending data according to an embodiment of the disclosure.

FIG. 4 is a schematic block diagram of a method 200 for data transmission according to an embodiment of the disclosure. As illustrated in FIG. 4, the method 200 is applied to an Internet of vehicles system. The method 200 includes part or all of the following contents.

In S210, a terminal device acquires service information of data to be sent.

In S220, the terminal device determines, from multiple transmission paths, a transmission path for transmitting the data to be sent, according to the service information.

It is to be noted that the service information of the data to be sent in the embodiment is similar to the service information of the data to be sent in the method 100, and both the first protocol layer and the second protocol layer are the same as those mentioned above. For simplicity, elaborations are omitted herein.

The Internet of vehicles system may include two types of data transmission paths: one is a cellular path, i.e., a data transmission path between a network device and a terminal device in FIG. 2, and the other is an SL path, i.e., a direct connection path between a terminal device and a terminal device in FIG. 2. Correspondingly, there are two types of air interfaces: one is a Uu interface capable of implementing communication between a vehicle, an infrastructure and another vehicle in such a manner that a network device serves as a control center and data is forwarded through the network device, and the other is a PC5 interface capable of implementing direct data transmission between vehicles. The Internet of vehicles has two working scenarios: one is a cellular network coverage-based scenario, in which the service may be provided through the Uu interface of a cellular network, to implement high-bandwidth large-coverage communication, or the service may be provided through the Pc5 interface to implement low-latency high-reliability direct communication between a vehicle and an ambient node; and the other is a working scenario independently of the cellular network, in which the Internet of vehicles road service is provided through the PC5 interface in a region deployed with no networks, to meet a driving safety requirement. In the cellular network coverage-based scenario, the Uu interface and the PC5 interface may be switched flexibly and seamlessly for data transmission.

Alternatively, the Internet of vehicles system may include a cellular path and at least one SL path, or may include multiple SL paths, different Radio Access Technologies (RATs) being adopted for the multiple SL paths, for example, an NR link, an LTE link or a WLAN link. That is, the terminal device may select, according to the service information, the transmission path from the cellular path and the SL path, or select the transmission path from the multiple transmission paths. There are no limits made in the embodiment of the disclosure.

Alternatively, in the embodiment of the disclosure, a network device or a server may configure a mapping relationship between different service information and different transmission paths in advance. Or, the mapping relationship may be pre-stored in the terminal device. For example, service type and transmission path are adopted. A voice service and a video service may be mapped to the cellular path, and a short messaging service may be mapped to the SL path. If the terminal device determines that a service type of the data to be sent is a voice service, the transmission path available for the terminal device may be the cellular path. If the terminal device determines that the service type of the data to be sent is a short messaging service, the transmission path available for the terminal device may be the SL path.

The transmission path may also be determined according to version information. For example, the cellular path is adopted for a service of Rel-14, and the SL path is adopted for a service of Rel-15.

Alternatively, in the embodiment of the disclosure, the operation that the terminal device determines the transmission path for transmitting the data to be sent from the multiple transmission paths according to the service information includes that: the terminal device determines, at a first protocol layer, the transmission path for transmitting the data to be sent from the multiple transmission paths according to the service information and path configuration information, the path configuration information being used for indicating a mapping relationship between service information and a transmission path.

That is, the network device may configure the mapping relationship between the transmission path and the service information, i.e., path configuration information, in advance for the terminal device, and then the terminal device, after acquiring the service information of the data to be sent, may acquire, from the configuration information, the corresponding transmission path. Furthermore, the terminal device may transmit, at the first protocol layer, the data to be sent to a protocol layer of the determined transmission path. It is to be understood that the first protocol layer may be an application layer, access layer or sublayer of the access layer in V2X.

For example, a V2X layer may determine to send the data to be sent in an NR link according to a mapping relationship between a service identifier and a path, and then transmit the data to be sent to a physical protocol layer of NR, the data being sent according to a transmission mechanism of NR. For another example, the V2X layer may submit the data to be sent to a PDCP layer in the access layer, together with the path configuration information for data submission, and the PDCP layer may determine to transmit the data to be sent to the physical protocol layer of NR according to the received path configuration information.

Therefore, according to the method for data transmission of the embodiment of the disclosure, the terminal device may send the data by use of a more suitable transmission path, and thus data transmission performance is improved.

The method for data transmission according to the embodiments of the disclosure is described above in detail and a data transmission device according to the embodiments of the disclosure will be described below in combination with FIG. 5 to FIG. 8. The technical characteristics described in the method embodiments are applied to the following device embodiments.

Figure 5:
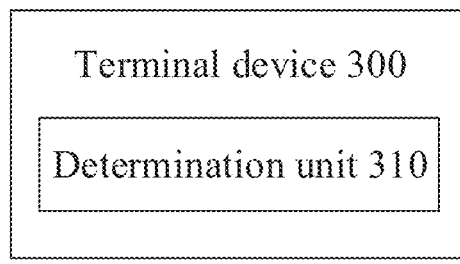
FIG. 5 is a schematic block diagram of a terminal device according to an embodiment of the disclosure.

FIG. 5 is a schematic block diagram of a terminal device 300 according to an embodiment of the disclosure. As illustrated in FIG. 5, the terminal device 300 is applied to an Internet of vehicles system. The terminal device 300 includes a determination unit 310.

The determination unit 310 is configured to determine, at a first protocol layer, a transmission mechanism for transmitting data to be sent, according to service information of the data to be sent.

Therefore, the terminal device in the embodiment of the disclosure may send the data by use of a more suitable transmission mechanism, and thus data transmission performance is improved.

Alternatively, in the embodiment of the disclosure, the service information includes at least one of the following information: a service identifier, an IP address, a service type, a service requirement, band information, version information, an FQDN, layer-2 address information, PPPP information, or PPPR information.

Alternatively, in the embodiment of the disclosure, the terminal device further includes an acquisition unit and a sending unit.

The acquisition unit is configured to acquire at a second protocol layer the service information of the data to be sent.

The sending unit is configured to send at the second protocol layer the service information to the first protocol layer.

Alternatively, in the embodiment of the disclosure, if the service information is the version information, the acquisition unit is specifically configured to determine, at the second protocol layer, the version information of the data to be sent, according to at least one piece of information of the following information: the service identifier, the IP address, the service type, the service requirement, the band information, the FQDN, the layer-2 address information, the PPPP information, or the PPPR information, the version information being used for indicating a protocol version for a service corresponding to the data to be sent.

Alternatively, in the embodiment of the disclosure, if the service information is at least one piece of information of the following information: the service identifier, the IP address, the service type, the service requirement, the band information, the FQDN, the layer-2 address information, the PPPP information, or the PPPR information, the determination unit is further configured to:

determine, at the first protocol layer, the version information of the data to be sent, according to the at least one piece of information, the version information being used for indicating the protocol version for the service corresponding to the data to be sent.

Alternatively, in the embodiment of the disclosure, the determination unit is specifically configured to:

determine the version information of the data to be sent according to the at least one piece of information and a mapping relationship between at least one piece of information and version information.

Alternatively, in the embodiment of the disclosure, the mapping relationship is pre-stored in the terminal device, or is configured by a network device, or is configured by a server.

Alternatively, in the embodiment of the disclosure, the transmission mechanism includes at least one of a digital modulation mechanism, a rate matching mechanism, a duplicate transmission mechanism, or a TxD.

Alternatively, in the embodiment of the disclosure, the digital modulation mechanism includes one of BPSK, QPSK, 16QAM, 64QAM and 256QAM.

Alternatively, in the embodiment of the disclosure, the first protocol layer is an access layer, and the second protocol layer is an application layer.

Alternatively, in the embodiment of the disclosure, the IP address is an IP address of the server.

Alternatively, in the embodiment of the disclosure, the determination unit is further configured to determine, at the first protocol layer, a transmission carrier for the data to be sent, according to a mapping relationship between a transmission mechanism and a transmission carrier.

Alternatively, in the embodiment of the disclosure, the determination unit is specifically configured to determine, at the first protocol layer, at least one transmission mechanism for transmitting the data to be sent, according to the service information; and the determination unit is further configured to determine, at the first protocol layer, the transmission mechanism for transmission of the data to be sent, from the at least one transmission mechanism, according to a mapping relationship between at least one transmission mechanism and a transmission carrier, and the transmission carrier for the data to be sent.

Alternatively, in the embodiment of the disclosure, the determination unit is further configured to determine, at a third protocol layer, the transmission carrier for the data to be sent, according to the mapping relationship between the transmission mechanism and the transmission carrier, the third protocol layer being a layer below the first protocol layer.

Alternatively, in the embodiment of the disclosure, the determination unit is specifically configured to determine, at the first protocol layer, the at least one transmission mechanism for transmitting the data to be sent according to the service information; and the determination unit is further configured to determine, at the third protocol layer, the transmission mechanism for transmission of the data to be sent, from the at least one transmission mechanism, according to the mapping relationship between the at least one transmission mechanism and the transmission carrier and the transmission carrier for the data to be sent, the third protocol layer being a layer below the first protocol layer.

It is to be understood that the terminal device 300 according to the embodiment of the disclosure may correspond to the terminal device in the method embodiment of the disclosure and the abovementioned and other operations and/or functions of each unit in the terminal device 300 are adopted to implement the corresponding flows executed by the terminal device in the method in FIG. 3 respectively and will not be elaborated herein for simplicity.

Figure 6:
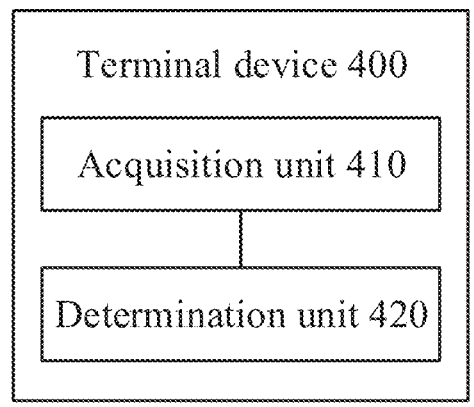
FIG. 6 is another schematic block diagram of a terminal device according to an embodiment of the disclosure.

FIG. 6 is a schematic block diagram of a terminal device 400 according to an embodiment of the disclosure. As illustrated in FIG. 6, the terminal device 400 is applied to an Internet of vehicles system. The terminal device 400 includes an acquisition unit 410 and a determination unit 420.

The acquisition unit 410 is configured to acquire service information of data to be sent.

The determination unit 420 is configured to determine a transmission path for transmitting the data to be sent, from multiple transmission paths, according to the service information.

Therefore, the terminal device in the embodiment of the disclosure may send the data by use of a more suitable transmission path, and thus data transmission performance is improved.

Alternatively, in the embodiment of the disclosure, the multiple transmission paths include a cellular path and at least one SL path, the SL path being a D2D path between two terminal devices.

Alternatively, in the embodiment of the disclosure, the multiple SL paths include at least two of an NR link, an LTE link, and a WLAN link.

Alternatively, in the embodiment of the disclosure, the service information includes at least one piece of information of the following information: a service identifier, an IP address, a service type, a service requirement, band information, version information, an FQDN, layer-2 address information, PPPP information, or PPPR information.

Alternatively, in the embodiment of the disclosure, the determination unit is specifically configured to determine, at a first protocol layer, the transmission path for transmitting the data to be sent, from the multiple transmission paths, according to the service information and path configuration information, the path configuration information being used for indicating a mapping relationship between service information and a transmission path.

Alternatively, in the embodiment of the disclosure, the service information and/or the path configuration information are/is configured through a network or pre-stored in the first protocol layer.

Alternatively, in the embodiment of the disclosure, the terminal device further includes a transmission unit, configured to transmit the data to be sent to a protocol layer of the transmission path determined by the determination unit at the first protocol layer.

Alternatively, in the embodiment of the disclosure, the first protocol layer is an application layer, an access layer or a sublayer of the access layer.

It is to be understood that the terminal device 400 according to the embodiment of the disclosure may correspond to the terminal device in the method embodiment of the disclosure and the abovementioned and other operations and/or functions of each unit in the terminal device 400 are adopted to implement the corresponding flows executed by the terminal device in the method in FIG. 4 respectively and will not be elaborated herein for simplicity.

Figure 7:
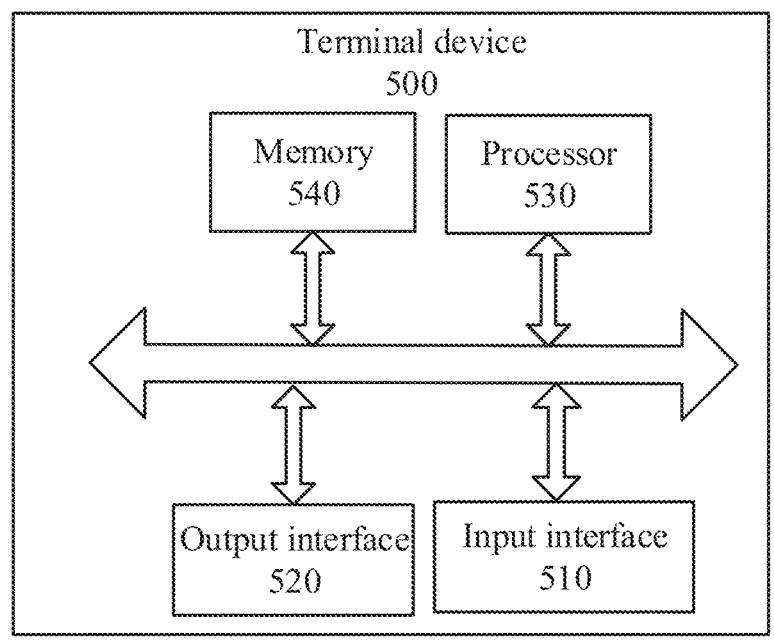
FIG. 7 is another schematic block diagram of a terminal device according to an embodiment of the disclosure.

As illustrated in FIG. 7, an embodiment of the disclosure also provides a terminal device 500. The terminal device 500 may be the terminal device 300 in FIG. 5, and may be configured to execute contents of the terminal device corresponding to the method 100 in FIG. 3. The terminal device 500 includes an input interface 510, an output interface 520, a processor 530 and a memory 540. The input interface 510, the output interface 520, the processor 530 and the memory 540 may be connected through a bus system. The memory 540 is configured to store a program, instructions or codes. The processor 530 is configured to execute the program instructions or codes in the memory 540 to control the input interface 510 to receive a signal, control the output interface 520 to send a signal and complete operations in the method embodiment.

Therefore, the terminal device of the embodiment of the disclosure may send the data by use of a more suitable transmission mechanism, and thus data transmission performance is improved.

It is to be understood that, in the embodiment of the disclosure, the processor 530 may be a Central Processing Unit (CPU), or the processor 530 may be another universal processor, a Digital Signal Processor (DSP), an Application Specific Integrated Circuit (ASIC), a Field Programmable Gate Array (FPGA) or another programmable logic device, discrete gate or transistor logic device and discrete hardware component and the like. The universal processor may be a microprocessor or the processor may also be any conventional processor and the like.

The memory 540 may include a Read-Only Memory (ROM) and a Random Access Memory (RAM), and provides instructions and data for the processor 530. A part of the memory 540 may further include a nonvolatile RAM. For example, the memory 540 may further store information of a device type.

In an implementation process, each content of the method may be completed by an integrated logic circuit of hardware in the processor 530 or instructions in a software form. The contents of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 540. The processor 530 reads information in the memory 540 and completes the contents of the method in combination with hardware. No more detailed descriptions will be made herein to avoid repetitions.

In a specific implementation mode, the sending unit in the terminal device 300 may be implemented by the output interface 520 in FIG. 7, and the acquisition unit and determination unit in the terminal device 300 may be implemented by the processor 530 in FIG. 7.

Figure 8:
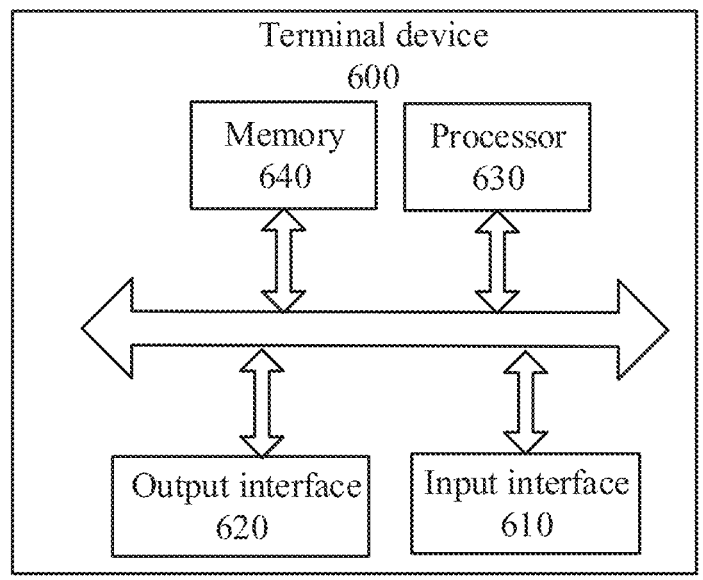
FIG. 8 is another schematic block diagram of a terminal device according to an embodiment of the disclosure.

As illustrated in FIG. 8, an embodiment of the disclosure also provides a terminal device 600. The terminal device 600 may be the terminal device 400 in FIG. 6, and may be configured to execute contents of the terminal device corresponding to the method 200 in FIG. 4. The terminal device 600 includes an input interface 610, an output interface 620, a processor 630 and a memory 640. The input interface 610, the output interface 620, the processor 630 and the memory 640 may be connected through a bus system. The memory 640 is configured to store a program, instructions or a code. The processor 630 is configured to execute the program instructions or code in the memory 640 to control the input interface 610 to receive a signal, control the output interface 620 to send a signal and complete operations in the method embodiment.

Therefore, the terminal device of the embodiment of the disclosure may send the data by use of a more suitable transmission path, and thus data transmission performance is improved.

It is to be understood that, in the embodiment of the disclosure, the processor 630 may be a CPU and the processor 630 may also be another universal processor, a DSP, an ASIC, an FPGA or another programmable logic device, discrete gate or transistor logic device and discrete hardware component and the like. The universal processor may be a microprocessor or the processor may also be any conventional processor and the like.

The memory 640 may include a ROM and a RAM and provides instructions and data for the processor 630. A part of the memory 640 may further include a nonvolatile RAM. For example, the memory 640 may further store information of a device type.

In an implementation process, each content of the method may be completed by an integrated logic circuit of hardware in the processor 630 or instructions in a software form. The contents of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a Programmable ROM (PROM) or Electrically Erasable PROM (EEPROM) and a register. The storage medium is located in the memory 640. The processor 630 reads information in the memory 640 and completes the contents of the method in combination with hardware. No more detailed descriptions will be made herein to avoid repetitions.

In a specific implementation mode, the acquisition unit and determination unit in the terminal device 400 may be implemented by the processor 630 in FIG. 6.

Figure 9:
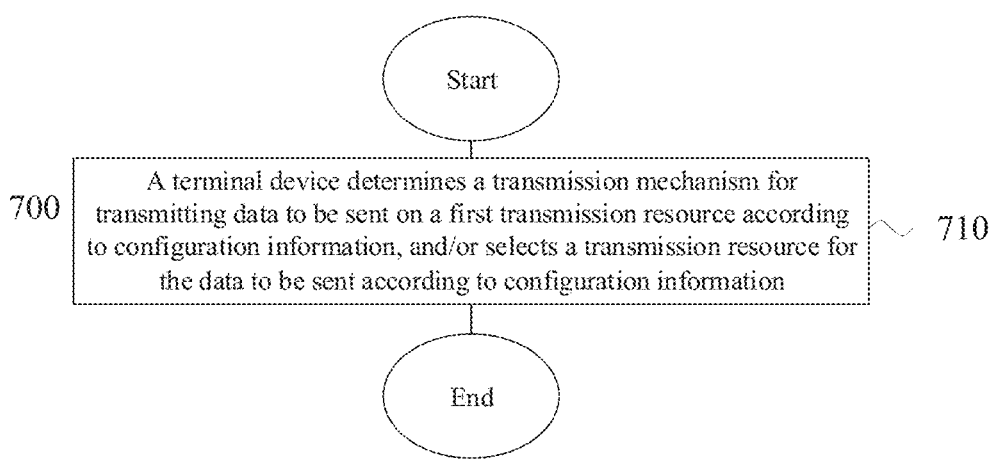
FIG. 9 is a schematic block diagram of another method for sending data according to an embodiment of the disclosure.

FIG. 9 is a schematic block diagram of a method for data transmission 700 according to an embodiment of the disclosure. As illustrated in FIG. 9, the method 700 is applied to an Internet of vehicles system. The method 700 includes part or all of the following contents.

In S710, a terminal device determines, at a first protocol layer, a transmission mechanism for transmitting data to be sent on a first transmission resource according to configuration information, and/or selects, at a first protocol layer, a transmission resource for the data to be sent, according to configuration information.

Specifically, a network device may configure selectable transmission mechanisms corresponding to different transmission resources for the terminal device. For example, the network device may configure a mapping relationship illustrated in Table 1 for the terminal device. It is to be understood that the transmission mechanism is the same as that described above. For simplicity, elaborations are omitted herein.

TABLE 1

| | |
|---|---|
| Transmission resource 1 | Transmission mechanism 1, transmission mechanism 2 and transmission mechanism 3 |
| Transmission resource 2 | Transmission mechanism 2 and transmission mechanism 4 |
| Transmission resource 3 | Transmission mechanism 3 and transmission mechanism 4 |
| Transmission resource 4 | Transmission mechanism 2, transmission mechanism 3 and transmission mechanism 4 |

If the terminal device selects to transmit the data to be sent on the transmission resource 1 in Table 1, the terminal device may determine the transmission mechanisms, including the transmission mechanism 1, the transmission mechanism 2 and the transmission mechanism 3, corresponding to the transmission resource 1 according to the configuration information, i.e., Table 1. The terminal device may select any transmission mechanism therein to transmit the data to be sent, and the terminal device may also select a transmission mechanism therein according to a certain rule to transmit the data to be sent. How the terminal device selects the transmission mechanism according to the configuration information is not limited in the embodiment of the disclosure.

Or, if the terminal device selects to transmit the data to be sent by use of the transmission mechanism 2 in Table 1, the terminal device may determine the transmission resources, including the transmission resource 1, the transmission resource 2 and the transmission resource 4, corresponding to the transmission mechanism 2 according to the configuration information, i.e., Table 2. The terminal device may select any transmission resource therein to transmit the data to be sent, and the terminal device may also select a transmission resource therein according to a certain rule to transmit the data to be sent. How the terminal device selects the transmission resource according to the configuration information is not limited in the embodiment of the disclosure.

Therefore, according to the method for data transmission of the embodiment of the disclosure, the transmission resource and/or transmission mechanism are/is determined according to the configuration information of the transmission resource and the transmission mechanism, which is favorable for improving data transmission performance of the Internet of vehicles system.

Alternatively, in the embodiment of the disclosure, the terminal device receives first indication information, the first indication information being used for indicating a first transmission mechanism in the at least one transmission mechanism; and the operation that the terminal device determines the transmission mechanism for transmitting the data to be sent on the first transmission resource according to the configuration information includes that: the terminal device determines the first transmission mechanism to be the transmission mechanism for transmitting the data to be sent on the first transmission resource according to the configuration information and the first indication information.

For example, for the transmission resource 1 in Table 1, the selectable transmission mechanisms are the transmission mechanism 1, the transmission mechanism 2 and the transmission mechanism 3 respectively, and the network device may further make configurations for the terminal device as follows: the transmission mechanism 1 corresponds to 00, the transmission mechanism 2 corresponds to 01 and the transmission mechanism 3 corresponds to 10. The network device may send indication information to the terminal device. For example, if the indication information is 10, the terminal device may determine the transmission mechanism 3 indicated by the indication information from multiple transmission mechanisms indicated by the configuration information, to be the transmission mechanism for transmitting the data to be sent.

Alternatively, in the embodiment of the disclosure, the method further includes that: the terminal device receives first indication information, the first indication information being used for indicating at least one transmission mechanism for transmitting the data to be sent; and the operation that the terminal device determines the transmission mechanism for transmitting the data to be sent on the first transmission resource according to the configuration information includes that: the terminal device determines the transmission mechanism for transmitting the data to be sent on the first transmission resource from an intersection of at least one transmission mechanism indicated by the configuration information and the at least one transmission mechanism indicated by the first indication information.

For example, if the terminal device selects to transmit the data to be sent on the transmission resource 1, it may be obtained according to Table 1, i.e., the configuration information, that the alternative transmission mechanisms on the transmission resource include the transmission mechanism 1, the transmission mechanism 2 and the transmission mechanism 3. If the indication information received by the terminal device indicates that the transmission mechanism for transmitting the data to be sent includes the transmission mechanism 3 and the transmission mechanism 4, the terminal device may acquire an intersection (i.e., the transmission mechanism 3) of the transmission mechanism 1, transmission mechanism 2 and transmission mechanism 3 indicated by the configuration information and the transmission mechanism 3 and transmission mechanism 4 indicated by the indication information, and the terminal device may further determine the transmission mechanism 3 to be the transmission mechanism for transmitting the data to be sent. It is to be understood that descriptions are made herein with the condition that the intersection includes only one transmission mechanism as an example, and when the intersection of the transmission mechanisms indicated by the configuration information and indicated by the indication information includes multiple transmission mechanisms, the terminal device may select any transmission mechanism from the intersection, or the terminal device may also select a transmission mechanism from the intersection according to a certain rule.

Alternatively, in the embodiment of the disclosure, the configuration information is used for indicating a mapping relationship between a transmission resource and a transmission mechanism, and the method further includes that: the terminal device receives second indication information, the second indication information being used for indicating a second transmission mechanism in the mapping relationship; and the operation that the terminal device selects the transmission resource for the data to be sent according to the configuration information includes that: the terminal device determines a transmission resource corresponding to the second transmission mechanism in the mapping relationship, to be the transmission resource for the data to be sent.

For example, if the indication information received by the terminal device indicates the transmission mechanism 2 in Table 1, the terminal device may determine according to the mapping relationship indicated by Table 1, i.e., the configuration information, that the transmission resource corresponding to the transmission mechanism 2 includes the transmission resource 1, the transmission resource 2 and the transmission resource 4, and the terminal device may select any transmission resource therein to transmit the data to be sent, or may select a transmission resource to transmit the data to be sent according to a certain rule.

Alternatively, in the embodiment of the disclosure, the configuration information is used for indicating the mapping relationship between the transmission resource and the transmission mechanism, and the method further includes that: the terminal device receives the second indication information, the second indication information being used for indicating the transmission mechanism for transmitting the data to be sent; and the operation that the terminal device selects the transmission resource for the data to be sent according to the configuration information includes that: when a transmission mechanism corresponding to a presently adopted transmission resource in the configuration information conflicts with the transmission mechanism indicated by the second indication information, the terminal device determines a transmission resource corresponding to the transmission mechanism indicated by the second indication information, to be the transmission resource for the data to be sent.

Specifically, the terminal device may continue transmitting the data to be sent on a transmission resource for sending data last time, and the terminal device may determine whether a transmission mechanism indicated by the configuration information and corresponding to the transmission resource adopted last time conflicts with the transmission mechanism indicated by the indication information or not at first, if NO, continues adopting the transmission resource adopted last time and, if YES, performs resource reselection. For example, if the transmission resource adopted last time is the transmission resource 1 in Table 1, the transmission mechanism corresponding to the transmission resource 1 in Table 1 includes the transmission mechanism 1, the transmission mechanism 2 and the transmission mechanism 3. If the indication information indicates the transmission mechanism 4, the terminal device may select any transmission resource from the transmission resource 2, transmission resource 3 and transmission resource 4 corresponding to the transmission mechanism 4 in Table 1 to transmit the data to be sent, or may select a transmission resource therein according to a certain rule to transmit the data to be sent.

Alternatively, in the embodiment of the disclosure, selection of the transmission resource may be resource pool selection and/or resource pool reselection, or selection of the transmission resource may be carrier selection and/or carrier reselection.

Alternatively, in the embodiment of the disclosure, the terminal device may also determine the transmission mechanism for transmitting the data to be sent and/or select the transmission resource for the data to be sent based on the service information, the configuration information and/or various indication information. It is to be understood that the service information mentioned here is the same as that described above and will not be elaborated herein.

The method for data transmission according to the embodiments of the disclosure is described above in detail and a data transmission device according to the embodiments of the disclosure will be described below in combination with FIG. 10 to FIG. 11. The technical characteristics described in the method embodiments are applied to the following device embodiments.

Figure 10:
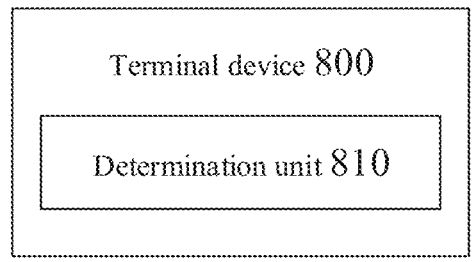
FIG. 10 is another schematic block diagram of a terminal device according to an embodiment of the disclosure.

FIG. 10 is a schematic block diagram of a terminal device 800 according to an embodiment of the disclosure. As illustrated in FIG. 10, the terminal device 800 is applied to an Internet of vehicles system. The terminal device 800 includes a determination unit 810.

The determination unit 810 is configured to determine a transmission mechanism for transmitting data to be sent on a first transmission resource according to configuration information and/or select a transmission resource for the data to be sent according to configuration information.

Therefore, the terminal device of the embodiment of the disclosure determines the corresponding transmission resource and/or transmission mechanism according to the configuration information, which is favorable for improving data transmission performance of the Internet of vehicles system.

Alternatively, in the embodiment of the disclosure, the configuration information is used for indicating at least one selectable transmission mechanism on the first transmission resource.

Alternatively, in the embodiment of the disclosure, the terminal device further includes a first receiving unit, configured to receive first indication information, the first indication information being used for indicating a first transmission mechanism in the at least one transmission mechanism.

The determination unit is specifically configured to determine the first transmission mechanism to be the transmission mechanism for transmitting the data to be sent on the first transmission resource, according to the configuration information and the first indication information.

Alternatively, in the embodiment of the disclosure, the terminal device further includes the first receiving unit, configured to receive the first indication information, the first indication information being used for indicating at least one transmission mechanism for transmitting the data to be sent; and the determination unit is specifically configured to determine the transmission mechanism for transmitting the data to be sent on the first transmission resource, from an intersection of the at least one transmission mechanism indicated by the configuration information and the at least one transmission mechanism indicated by the first indication information.

Alternatively, in the embodiment of the disclosure, the configuration information is used for indicating a mapping relationship between a transmission resource and a transmission mechanism.

Alternatively, in the embodiment of the disclosure, the terminal device further includes a second receiving unit, configured to receive second indication information, the second indication information being used for indicating a second transmission mechanism in the mapping relationship; and the determination unit is specifically configured to determine a transmission resource corresponding to the second transmission mechanism in the mapping relationship to be the transmission resource for the data to be sent.

Alternatively, in the embodiment of the disclosure, the terminal device further includes the second receiving unit, configured to receive the second indication information, the second indication information being used for indicating the transmission mechanism for transmitting the data to be sent; and the determination unit is specifically configured to, when a transmission mechanism corresponding to a presently adopted transmission resource in the configuration information conflicts with the transmission mechanism indicated by the second indication information, determine a transmission resource corresponding to the transmission mechanism indicated by the second indication information to be the transmission resource for the data to be sent.

Alternatively, in the embodiment of the disclosure, selection of the transmission resource includes carrier selection and/or carrier reselection.

Alternatively, in the embodiment of the disclosure, selection of the transmission resource includes resource pool selection and/or resource pool reselection.

It is to be understood that the terminal device 800 according to the embodiment of the disclosure may correspond to the terminal device in the method embodiment of the disclosure and the abovementioned and other operations and/or functions of each unit in the terminal device 800 are adopted to implement the corresponding flows executed by the terminal device in the method in FIG. 9 respectively and will not be elaborated herein for simplicity.

Figure 11:
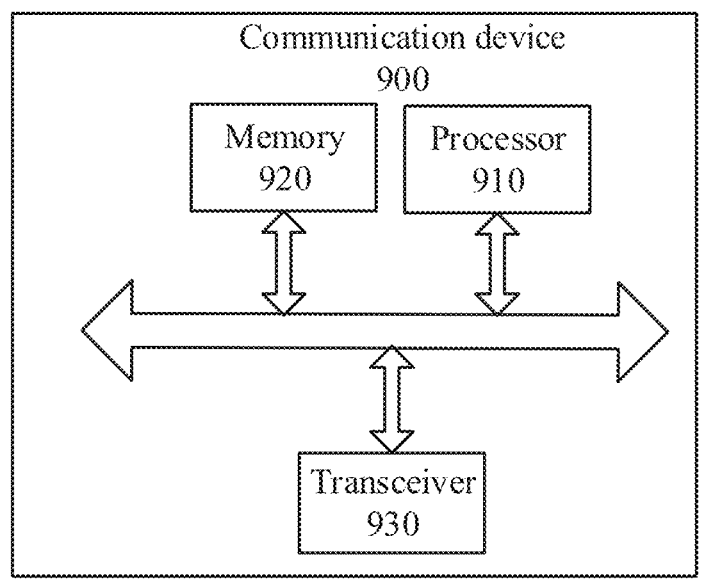
FIG. 11 is another schematic block diagram of a terminal device according to an embodiment of the disclosure.

As illustrated in FIG. 11, an embodiment of the disclosure also provides a terminal device 900. The terminal device 900 may be the terminal device 800 in FIG. 10, and may be configured to execute contents of the terminal device corresponding to the method 700 in FIG. 9. The terminal device 900 illustrated in FIG. 11 includes a processor 910, and the processor 910 may call and run a computer program in a memory to implement the method in the embodiment of the disclosure.

Therefore, the terminal device of the embodiment of the disclosure determines the corresponding transmission resource and/or transmission mechanism according to the configuration information, which is favorable for improving data transmission performance of the Internet of vehicles system.

Alternatively, as illustrated in FIG. 11, the terminal device 900 may further include the memory 920. The processor 910 may call and run the computer program in the memory 920 to implement the method in the embodiment of the disclosure.

The memory 920 may be an independent device independent of the processor 910 and may also be integrated into the processor 910.

Alternatively, as illustrated in FIG. 11, the terminal device 900 may further include a transceiver 930, and the processor 910 may control the transceiver 930 to communicate with another device, specifically sending information or data to the other device or receiving information or data sent by the other device.

The transceiver 930 may include a transmitter and a receiver. The transceiver 930 may further include antennae, and the number of the antennae may be one or more.

Alternatively, the terminal device 900 may be a terminal device of the embodiment of the disclosure, and the terminal device 900 may implement corresponding flows implemented by the terminal device in each method of the embodiments of the disclosure. For simplicity, elaborations are omitted herein.

In a specific implementation mode, the first receiving unit and second receiving unit in the terminal device 800 may be implemented by the transceiver 930 in FIG. 11, and the acquisition unit in the terminal device 800 may be implemented by the processor 910 in FIG. 11.

Figure 12:
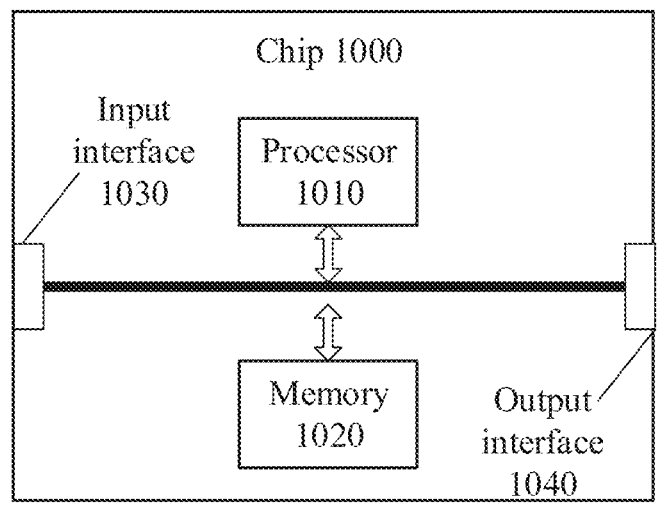
FIG. 12 is a schematic block diagram of a chip according to an embodiment of the disclosure.

FIG. 12 is a schematic block diagram of a chip 1000 according to an embodiment of the disclosure. The chip 1000 illustrated in FIG. 12 includes a processor 1010, and the processor 1010 may call and run a computer program in a memory to implement the method 100 in the embodiment of the disclosure.

Alternatively, as illustrated in FIG. 12, the chip 1000 may further include the memory 1020. The processor 1010 may call and run the computer program in the memory 1020 to implement the method in the embodiment of the disclosure.

The memory 1020 may be an independent device independent of the processor 1010 and may also be integrated into the processor 1010.

Alternatively, the chip 1000 may further include an input interface 1030. The processor 1010 may control the input interface 1030 to communicate with another device or chip, specifically acquiring information or data sent by the other device or chip.

Alternatively, the chip 1000 may further include an output interface 1040. The processor 1010 may control the output interface 1040 to communicate with the other device or chip, specifically outputting information or data sent by the other device or chip.

Alternatively, the chip may be applied to the terminal device of the embodiment of the disclosure, and the chip may implement corresponding flows implemented by the terminal device in the method 100 of the embodiment of the disclosure. For simplicity, elaborations are omitted herein.

It is to be understood that the chip mentioned in the embodiment of the disclosure may also be called a system-level chip, a system chip, a chip system or a system on chip, etc.

Figure 13:
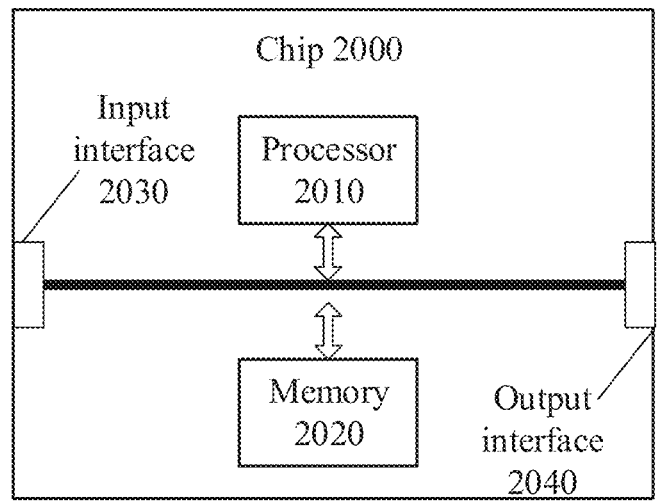
FIG. 13 is another schematic block diagram of a chip according to an embodiment of the disclosure.

FIG. 13 is a schematic block diagram of a chip 2000 according to an embodiment of the disclosure. The chip 2000 illustrated in FIG. 13 includes a processor 2010, and the processor 2010 may call and run a computer program in a memory to implement the method 200 in the embodiment of the disclosure.

Alternatively, as illustrated in FIG. 13, the chip 2000 may further include the memory 2020. The processor 2010 may call and run the computer program in the memory 2020 to implement the method in the embodiment of the disclosure.

The memory 2020 may be an independent device independent of the processor 2010 and may also be integrated into the processor 2010.

Alternatively, the chip 2000 may further include an input interface 2030. The processor 2010 may control the input interface 2030 to communicate with another device or chip, specifically acquiring information or data sent by the other device or chip.

Alternatively, the chip 2000 may further include an output interface 2040. The processor 2010 may control the output interface 2040 to communicate with the other device or chip, specifically outputting information or data sent by the other device or chip.

Alternatively, the chip may be applied to the terminal device of the embodiment of the disclosure, and the chip may implement corresponding flows implemented by the terminal device in the method 200 of the embodiment of the disclosure. For simplicity, elaborations are omitted herein.

It is to be understood that the chip mentioned in the embodiment of the disclosure may also be called a system-level chip, a system chip, a chip system or a system on chip, etc.

Figure 14:
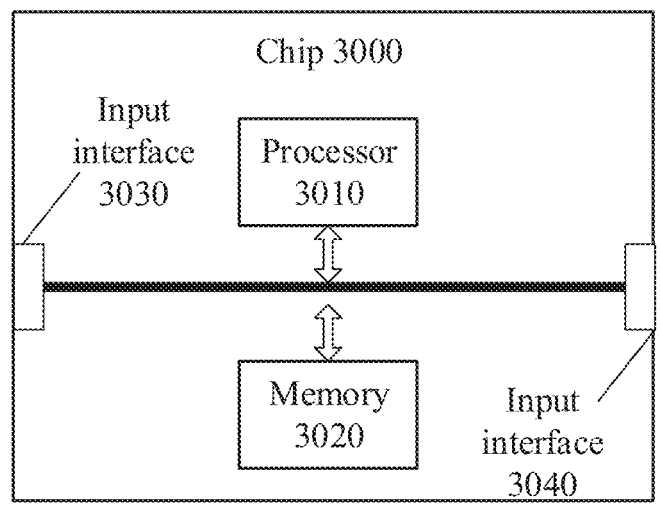
FIG. 14 is another schematic block diagram of a chip according to an embodiment of the disclosure.

FIG. 14 is a schematic block diagram of a chip 3000 according to an embodiment of the disclosure. The chip 3000 illustrated in FIG. 14 includes a processor 3010, and the processor 3010 may call and run a computer program in a memory to implement the method 700 in the embodiment of the disclosure.

Alternatively, as illustrated in FIG. 14, the chip 3000 may further include the memory 3020. The processor 3010 may call and run the computer program in the memory 3020 to implement the method in the embodiment of the disclosure.

The memory 3020 may be an independent device independent of the processor 3010 and may also be integrated into the processor 3010.

Alternatively, the chip 3000 may further include an input interface 3030. The processor 3010 may control the input interface 3030 to communicate with another device or chip, specifically acquiring information or data sent by the other device or chip.

Alternatively, the chip 3000 may further include an output interface 3040. The processor 3010 may control the output interface 3040 to communicate with the other device or chip, specifically outputting information or data sent by the other device or chip.

Alternatively, the chip may be applied to the terminal device of the embodiment of the disclosure, and the chip may implement corresponding flows implemented by the terminal device in the method 700 of the embodiment of the disclosure. For simplicity, elaborations are omitted herein.

It is to be understood that the chip mentioned in the embodiment of the disclosure may also be called a system-level chip, a system chip, a chip system or a system on chip, etc.

The processor mentioned above may be a universal processor, a DSP, an ASIC, an FPGA or another programmable logical device, transistor logical device and discrete hardware component, etc. The universal processor mentioned above may be a microprocessor or may also be any conventional processor and the like.

The memory mentioned above may be a volatile memory or a nonvolatile memory, or may also include both the volatile and nonvolatile memories. The nonvolatile memory may be a ROM, a PROM, an Erasable PROM (EPROM), an EEPROM or a flash memory. The volatile memory may be a RAM.

It is to be understood that the memory is exemplarily but unlimitedly described. For example, the memory in the embodiments of the disclosure may also be a Static RAM (SRAM), a Dynamic RAM (DRAM), a Synchronous DRAM (SDRAM), a Double Data Rate SDRAM (DDRS-DRAM), an Enhanced SDRAM (ESDRAM), a Synchlink DRAM (SLDRAM) and a Direct Rambus RAM (DR RAM). That is, the memory in the embodiments of the disclosure is intended to include, but not limited to, memories of these and any other proper types.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of each embodiment of the disclosure. The storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for data transmission, applied to an Internet of vehicles system, and comprising:
   acquiring, by a terminal device, version information of data to be sent; and
   determining, by the terminal device, a digital modulation mechanism for transmitting the data to be sent, according to the version information of the data to be sent,
   wherein, acquiring, by the terminal device, the version information of the data to be sent comprises:
      determining, by the terminal device, the version information of the data to be sent according to at least one piece of information of the following information: a service identifier, an internet protocol (IP) address, a service type, a service requirement, a fully qualified domain name (FQDN), layer-2 address information, proximity-based service (ProSe) per-packet priority (PPPP) information, or ProSe per-packet reliability (PPPR) information,
      wherein the version information is used for indicating a protocol version for a service corresponding to the data to be sent,
   wherein determining, by the terminal device, the digital modulation mechanism for transmitting the data to be sent, according to the version information of the data to be sent comprises:
      determining, by the terminal device, the digital modulation mechanism for transmitting the data to be sent, according to the protocol version for the service indicated by the version information.

2. The method of claim 1, wherein determining, by the terminal device, the version information of the data to be sent according to the at least one piece of information comprises:
   determining, by the terminal device, the version information of the data to be sent, according to the at least one piece of information and a mapping relationship between the at least one piece of information and the version information.

3. The method of claim 2, wherein the mapping relationship between the at least one piece of information and the version information is pre-stored in the terminal device, or is configured by a network device, or is configured by a server.

4. The method of claim 1, wherein the protocol version for the service corresponding to the data to be sent comprises at least one of: a protocol version of 3rd Generation Partnership Project (3GPP) Release-14 (Rel-14), or a protocol version of Rel-15.

5. The method of claim 1, wherein the digital modulation mechanism comprises one of binary phase shifting keying (BPSK), quadrature phase shifting keying (QPSK), 16 quadrature amplitude modulation (QAM), 64QAM and 256QAM.

6. A terminal device, comprising:
a processor, configured to:
acquire version information of data to be sent; and
determine a digital modulation mechanism for transmitting the data to be sent, according to the version information of the data to be sent,
wherein the processor is configured to:
determine the version information of the data to be sent according to at least one piece of information of the following information: a service identifier, an internet protocol (IP) address, a service type, a service requirement, a fully qualified domain name (FQDN), layer-2 address information, proximity-based service (ProSe) per-packet priority (PPPP) information, or ProSe per-packet reliability (PPPR) information,
wherein the version information is used for indicating a protocol version for a service corresponding to the data to be sent,
wherein the processor is configured to:
determine the digital modulation mechanism for transmitting the data to be sent, according to the protocol version for the service indicated by the version information.

7. The terminal device of claim 6, wherein the processor is configured to:
determine the version information of the data to be sent, according to the at least one piece of information and a mapping relationship between the at least one piece of information and the version information.

8. The terminal device of claim 7, wherein the mapping relationship between the at least one piece of information and the version information is pre-stored in the terminal device, or is configured by a network device, or is configured by a server.

9. The terminal device of claim 6, wherein the protocol version for the service corresponding to the data to be sent comprises at least one of: a protocol version of 3rd Generation Partnership Project (3GPP) Release-14 (Rel-14), or a protocol version of Rel-15.

10. The terminal device of claim 6, wherein the digital modulation mechanism comprises one of binary phase shifting keying (BPSK), quadrature phase shifting keying (QPSK), 16 quadrature amplitude modulation (QAM), 64QAM and 256QAM.

* * * * *